Figure 2:
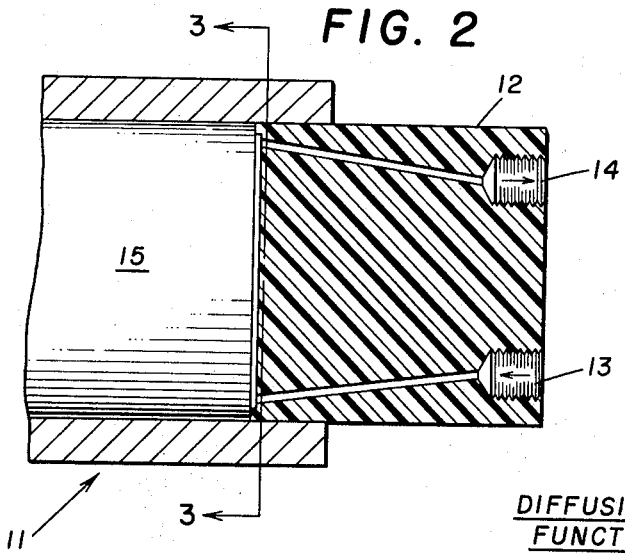
Figure 3:
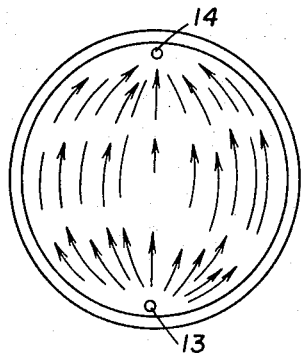
Figure 5:
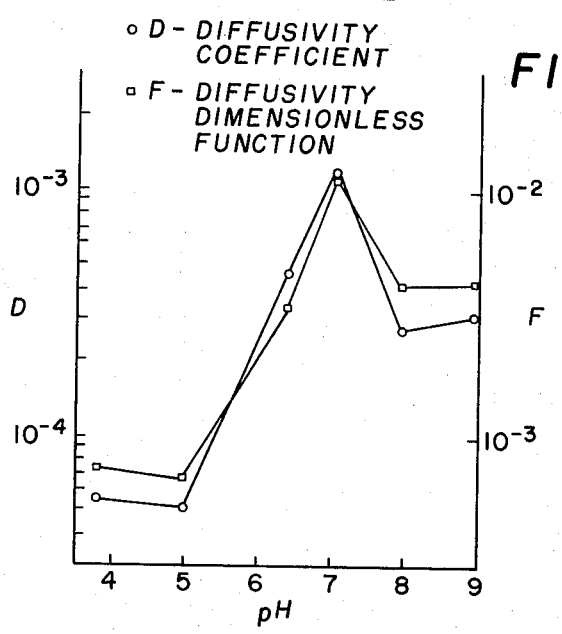
Figure 4:
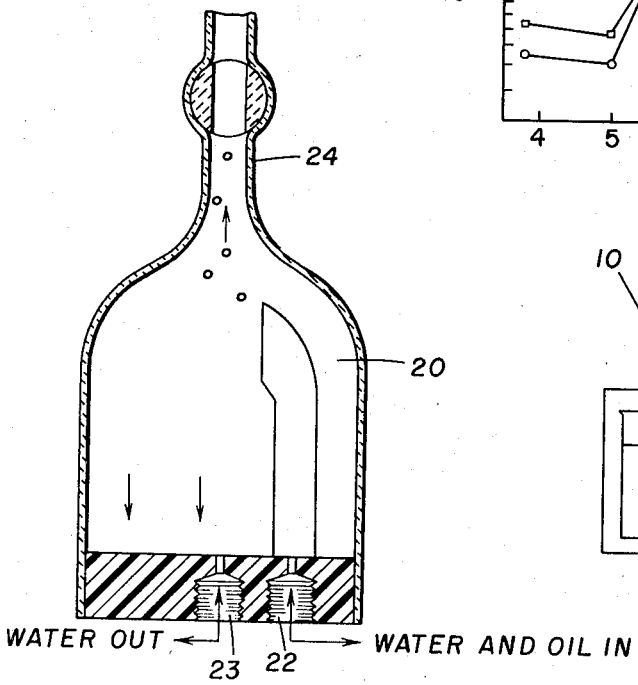
Figure 1:
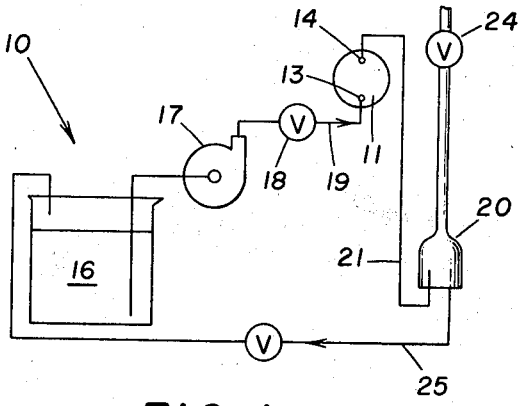

Oct. 3, 1972 J. M. McMILLEN T903,015

IMBIBITION WATERFLOODING PROCESS

Filed Oct. 18, 1971

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 7

T903,015
IMBIBITION WATERFLOODING PROCESS
James M. McMillen, Arlington, Tex., assignor to Mobil Oil Corporation
Filed Oct. 18, 1971, Ser. No. 190,011
Int. Cl. E21b *43/22*
U.S. Cl. 166—252
1 Sheet Drawing. 12 Pages Specification

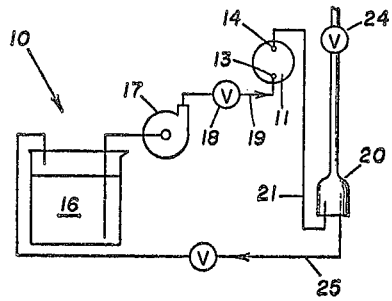

An imbitition waterflooding process for recovering petroleum from a reservoir wherein the pH of the imbibing fluid, e.g., water, is adjusted to a desired value that will enhance production. By means of controlled experiments, a pH value of water is determined that will best displace a particular oil from a particular reservoir. Waters which are available for waterflooding said reservoir are tested and the pH value of the most suitable is adjusted and buffered to the desired pH value. This water is then injected into the reservoir.